(12) United States Patent
Kuroe et al.

(10) Patent No.: US 7,357,407 B2
(45) Date of Patent: Apr. 15, 2008

(54) AIR BAG SYSTEM

(75) Inventors: Takeshi Kuroe, Saitama (JP); Tadanori Horiuchi, Saitama (JP); Satoshi Iijima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 10/843,345

(22) Filed: May 12, 2004

(65) Prior Publication Data
US 2005/0023803 A1 Feb. 3, 2005

(30) Foreign Application Priority Data
May 19, 2003 (JP) ............... 2003-140276

(51) Int. Cl.
*B60R 21/02* (2006.01)
(52) U.S. Cl. ............... 280/728.2; 280/730.1
(58) Field of Classification Search ............. 280/728.2, 280/730.1
See application file for complete search history.

(56) References Cited

U.S. PATENT DOCUMENTS

| | | | | |
|---|---|---|---|---|
| 5,435,593 A | * | 7/1995 | Hiramitsu et al. | 280/728.2 |
| 5,788,266 A | * | 8/1998 | Rose et al. | 280/728.2 |
| 6,007,090 A | * | 12/1999 | Hosono et al. | 280/730.2 |
| 6,053,270 A | * | 4/2000 | Nishikawa et al. | 180/168 |
| 6,217,048 B1 | * | 4/2001 | Saiki et al. | 280/152.1 |
| 6,354,622 B1 | * | 3/2002 | Ulbrich et al. | 280/731 |
| 6,592,141 B1 | * | 7/2003 | Dancasius et al. | 780/728.2 |
| 6,758,489 B2 | * | 7/2004 | Xu | 280/728.1 |
| 6,991,254 B2 | * | 1/2006 | Yanagibashi et al. | 280/730.1 |
| 2003/0042712 A1 | * | 3/2003 | Henderson et al. | 280/728.2 |
| 2003/0075373 A1 | * | 4/2003 | Sawa et al. | 180/271 |

FOREIGN PATENT DOCUMENTS

| | | |
|---|---|---|
| DE | 4439576 A1 | 5/1996 |
| DE | 19731314 A1 | 1/1999 |
| DE | 19858691 A1 | 6/2000 |
| JP | 5-76911 U | 10/1993 |
| JP | 9-71208 A | 3/1997 |

* cited by examiner

*Primary Examiner*—Paul N. Dickson
*Assistant Examiner*—Timothy D. Wilhelm
(74) *Attorney, Agent, or Firm*—Birch, Stewart, Kolasch & Birch, LLP

(57) ABSTRACT

To suppress the transmission of vibrations from a vehicle body and an engine to an inflator in an air bag system. Rubber mounts are fitted to a retainer box for accommodating an air bag. A flange of an inflator is placed on the rubber mounts, and bolts are inserted through set plates for connecting the air bag to the inflator and through the flange. The bolts are further inserted through the rubber mounts and nuts are tightened to the bolts.

16 Claims, 5 Drawing Sheets

AIR BAG SYSTEM

CROSS-REFERENCE TO RELATED APPLICATIONS

The present application claims priority under 35 USC 119 to Japanese Patent Application No. 2003-140276 filed on May 19, 2003 the entire contents thereof is hereby incorporated by reference.

BACKGROUND OF THE INVENTION

1. Field of the Invention

The present invention relates to an air bag system, and more particularly to an air bag system having a structure capable of suppressing transmission of vibrations from a vehicle body and an engine to an inflator.

2. Description of Background Art

An air bag system includes an air bag adapted to be developed between an occupant and a vehicle body to thereby prevent direct transmission of impact exerted on the vehicle to the occupant and an inflator for inflating the air bag. An air bag system mounted on a steering wheel of a vehicle is disclosed in Japanese Utility Model Laid-open No. Hei 5-76911. This conventional air bag system includes an inflator and a base plate for retaining a cover for the inflator. The base plate is fixed through a bracket to a hub of the steering wheel, thereby mounting the air bag system to the steering wheel.

Another air bag system mounted on a steering wheel is disclosed in Japanese Patent Laid-open No. Hei 9-71208.

In a two-wheeled or three-wheeled motorcycle, it is not easy to mount an air bag system to a steering handlebar as compared to a steering wheel. The installation space for the air bag system is limited as compared with a four-wheeled vehicle. Accordingly, it has been considered to mount the air bag system to any member of the motorcycle other than the steering handlebar, e.g., a body frame of the motorcycle.

In this case, the air bag system is mounted on the member that is not originally designed to resist vibrations. Therefore, it is required to increase the vibration resistance of the air bag system, i.e., the inflator. However, increasing the vibration resistance of the inflator causes a size increase and a complication with respect to the inflator or a supporting member for the inflator. As a result, this air bag system is not suitable for a two-wheeled or three-wheeled motorcycle.

SUMMARY AND OBJECTS OF THE INVENTION

It is accordingly an object of the present invention to provide an air bag system which can be suitably mounted on a two-wheeled or three-wheeled motorcycle by improving vibration resistance without causing an increase in size or other complications.

In accordance with a first aspect of the invention, there is provided an air bag system including a retainer box, an inflator mounted in the retainer box, and an air bag connected to the inflator. The inflator is connected through a damping elastic member to the retainer box.

In accordance with a second aspect of the invention, the damping elastic member includes a rubber mount inserted through a bottom portion of the retainer box and retained thereto. The inflator is connected to the retainer box by a bolt inserted through the rubber mount and a nut tightened to the bolt.

In accordance with a third aspect of the invention, the air bag system further includes a set plate for connecting an opening portion of the air bag to the inflator; the set plate and the inflator are secured to the retainer box by the bolt inserted through the set plate, a flange formed on the inflator, and the rubber mount.

In accordance with a fourth aspect of the invention, the bottom portion of the retainer box is provided with a bracket adapted to be connected to a body frame of a motorcycle.

With the first to fourth aspects of the invention, the inflator is connected through the damping elastic member to the retainer box. Accordingly, transmission of vibrations from the retainer box to the inflator can be suppressed by the damping elastic member. For example, with the fourth aspect of the invention, transmission of vibrations from the body frame of the motorcycle to the inflator can be suppressed in the case that the air bag system is connected to the body frame and the vibrations of the body frame are transmitted to the retainer box.

In accordance with a fifth aspect of the invention, there is provided an air bag system for a motorcycle including a retainer box, an inflator mounted in the retainer box, and an air bag connected to the inflator; the retainer box being connected through a damping elastic member to a body frame of the motorcycle.

In accordance with a sixth aspect of the invention, a bottom portion of the retainer box is provided with a bracket adapted to be connected to the body frame; and the damping elastic member includes a rubber mount interposed between the bracket and the body frame.

With the fifth to sixth aspects of the invention, transmission of vibrations from the body frame to the retainer box can be suppressed by the damping elastic member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
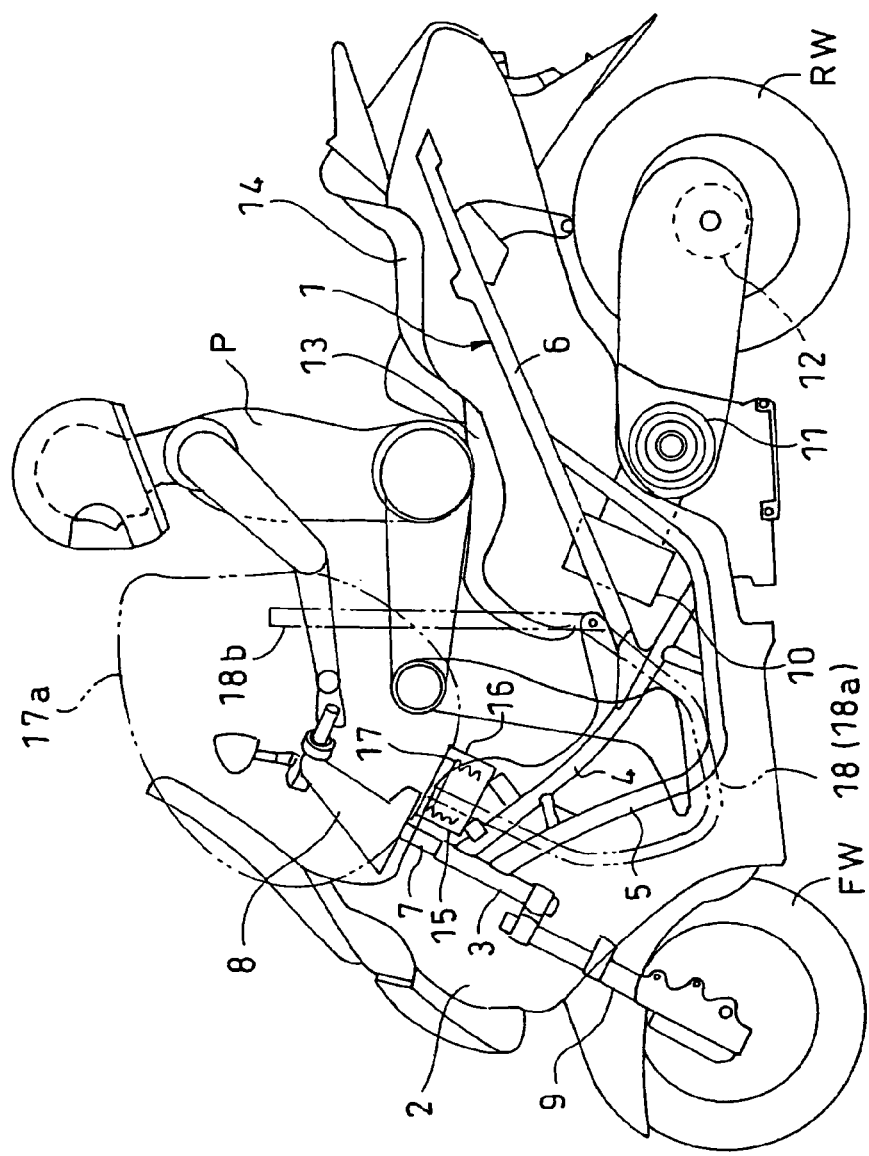
FIG. 2 is a side view of a motorcycle including the air bag system shown in FIG. 1.

The present invention will now be described in detail with reference to the drawings. FIG. 2 is a side view of a motorcycle having an air bag system according to a preferred embodiment of the present invention. As shown in FIG. 2, the motorcycle includes a body frame 1 and a cowl 2 for covering the body frame 1. The cowl 2 is shown transparently as only a schematic outline for the purpose of understanding an essential part of the present invention. The body frame 1 is composed of a substantially upright head pipe 3 located at a front portion of the vehicle, a pair of right and left upper frames 4 welded at their front ends to the head pipe 3 and extending rearwardly, a pair of right and left lower frames 5 welded at their front ends to the head pipe 3 and extending downwardly and rearwardly, and a rear frame 6 joined to the upper frames 4 and the lower frames 5 and extending rearwardly.

A steering shaft 7 is inserted through the head pipe 3. A steering handlebar 8 is connected to the upper end of the steering shaft 7 with a front fork 9 being connected to the lower end of the steering shaft 7. A front wheel FW is supported to the front fork 9. An engine 10 is mounted to the lower frames 5 and the rear frame 6. A transmission 11 and a clutch 12 are provided on the rear side of the engine 10, so as to transmit power from the engine 10 to a rear wheel RW. A rider's seat 13 and a passenger's seat 14 are provided above the rear frame 6.

An air bag system 15 is mounted on the upper frames 4. As hereinafter described in detail, the air bag system 15 includes a retainer box 16 bolted to brackets joined to the upper frames 4 and an air bag 17 accommodated in the retainer box 16. When a sensor (not shown) detects acceleration larger than a predetermined value in case of a collision of the vehicle, for example, the air bag 17 is inflated and developed as shown by a phantom line 17a to thereby protect the rider (occupant) P from impact. The air bag 17 is anchored to the body frame 1 by a pair of right and left bag anchoring members 18. In general, a motorcycle has no compartment unlike a four-wheeled vehicle. Accordingly, to develop the air bag 17 at a desired position and thereby restrain the rider P more reliably, the air bag 17 that is developed is anchored to the body frame 1 not only by the retainer box 16, but also by the bag anchoring members 18, thereby holding the air bag 17 that is developed at the desired position. Each bag anchoring member 18 is joined at one end thereof to the air bag 17 with the other end of each bag anchoring member being connected to the rear frame 6.

In the condition where the air bag 17 is accommodated in the retainer box 16, each bag anchoring member 18 is retracted at a position 18a along the cowl 2. When the air bag 17 is developed, each bag anchoring member 18 is extended to a position 18b, thereby defining the developed position of the air bag 17. Each bag anchoring member 18 may be provided by a beltlike or striplike member capable of defining the developed position of the air bag 17. As a modification, each bag anchoring member 18 may be provided by a plurality of beltlike or striplike members. Further, a net may be provided between these beltlike or striplike members.

Figure 3:
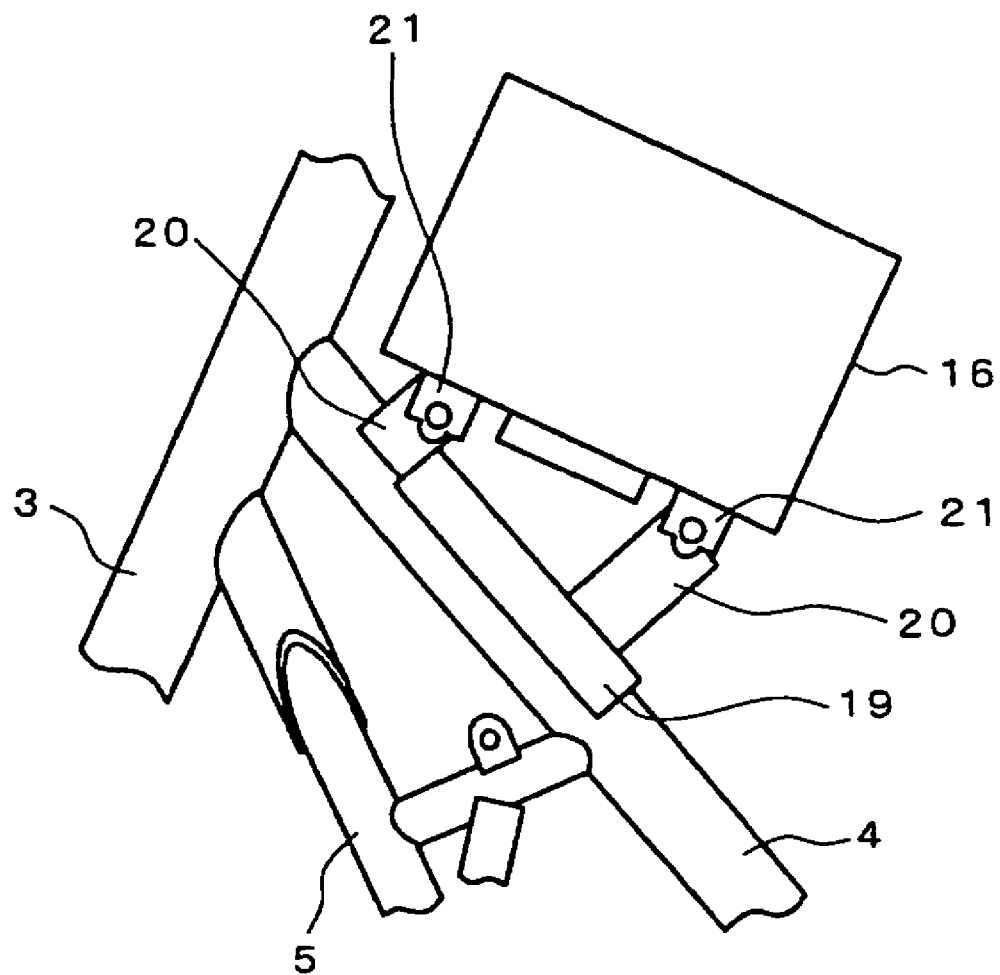
FIG. 3 is an enlarged side view of an essential part of the motorcycle including the air bag system shown in FIG. 1.

FIG. 3 is an enlarged side view of an essential part of the motorcycle, showing a mounted condition of the air bag system 15. A retaining plate 19 is mounted so as to connect the right and left upper frames 4. Four brackets 20 (two front brackets 20 and two rear brackets 20) are joined to the upper surface of the retaining plate 19. On the other hand, four brackets 21 are joined to the lower surface of the retainer box 16 so as to respectively correspond to the four brackets 20 fixed through the retaining plate 19 to the upper frames 4. These brackets 20 and 21 are bolted to each other, thereby connecting the retainer box 16 to the upper frames 4.

Figure 1:
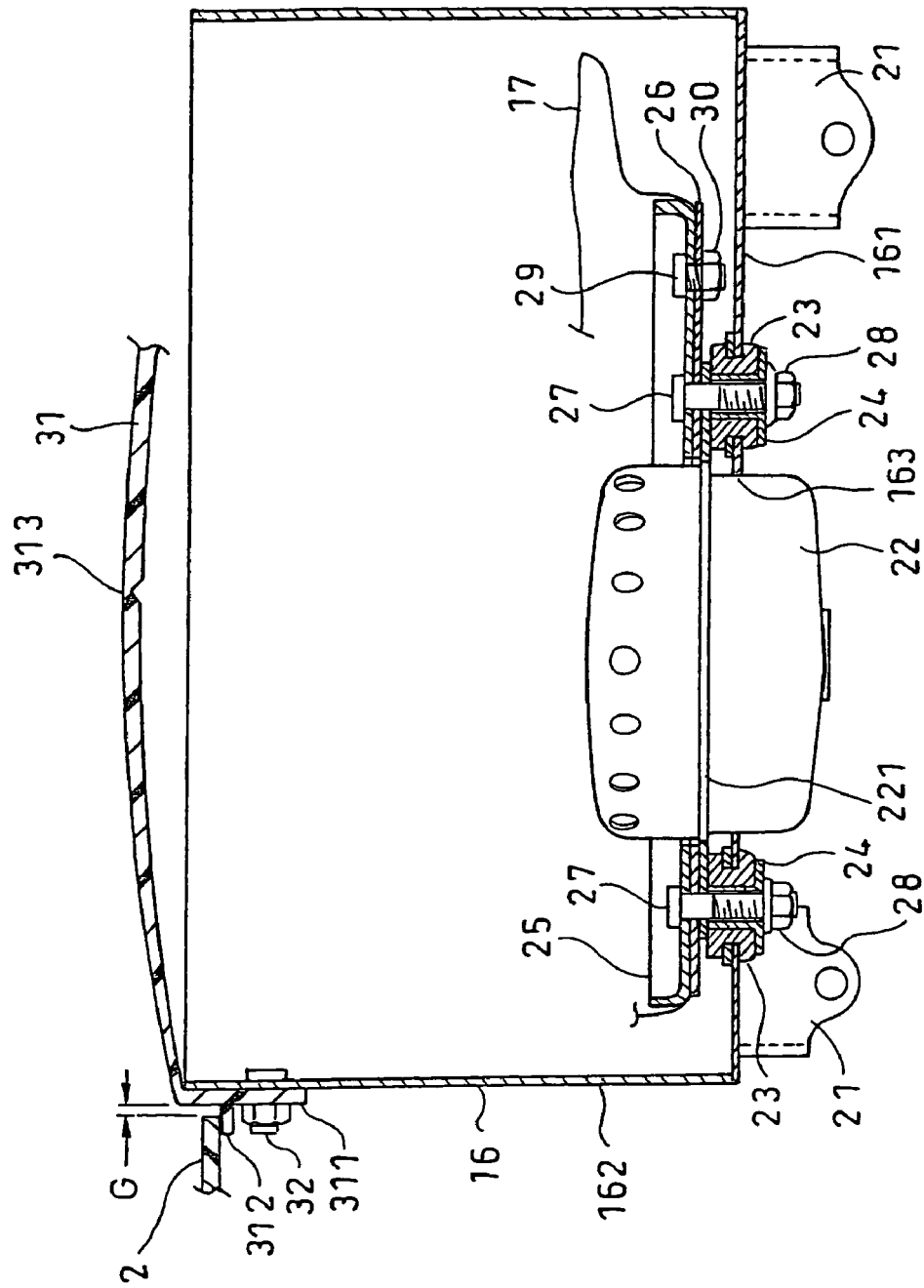
FIG. 1 is a sectional view of an air bag system according to a first preferred embodiment of the present invention.
Figure 4:
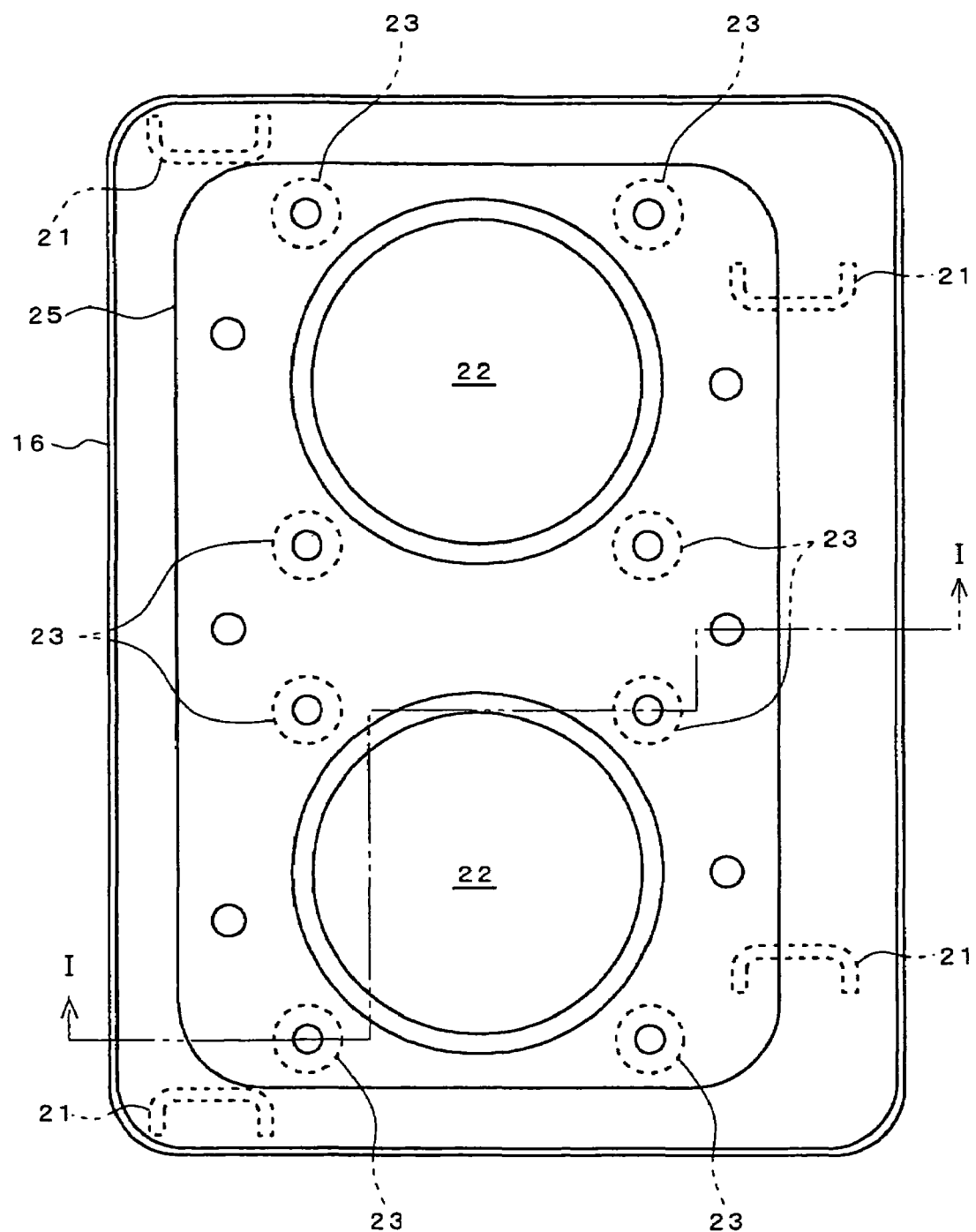
FIG. 4 is a plan view of the air bag system shown in FIG. 1.

FIG. 4 is a plan view of the air bag system 15 in the condition where a lid is removed, and FIG. 1 is a cross section taken along the line I-I in FIG. 4. In FIG. 4, the lid is shown. The retainer box 16 is composed of a bottom plate 161, a side plate 162 extending upwardly from the outer edge of the bottom plate 161, and the brackets 21 joined to the lower surface of the bottom plate 161. The bottom plate 161 is formed with two through holes 163 (one of which is shown in FIG. 1). Two inflators 22 (see FIG. 4) are inserted at their lower portions into the two through holes 163, respectively, and are supported to the bottom plate 161. Each inflator 22 functions to generate gas for filling the air bag 17 when a large acceleration is applied to the vehicle body such as in the case of a collision or the like. Each inflator 22 has a flange 221 projecting radially outwardly from its cylindrical surface. This flange 221 is bolted to the bottom plate 161, thereby fixing each inflator 22 to the retainer box 16.

In fixing each inflator 22 to the retainer box 16, a damping means is provided to prevent direct propagation of the vibrations from the retainer box 16 to each inflator 22. As the damping means, four rubber mounts 23 are used for each inflator 22 as shown in FIG. 4. Each rubber mount 23 is in the form of a bobbin consisting of a cylindrical body portion and a pair of upper and lower flange portions projecting radially outwardly from the opposite ends of the cylindrical body portion. Each rubber mount 23 is retained to the bottom plate 161 in such a manner that the cylindrical body portion of each rubber mount 23 is inserted through a hole formed through the bottom plate 161 with the upper and lower flange portions of each rubber mount 23 sandwiching the bottom plate 161 from its opposite sides. Each rubber mount 23 is formed with a central bolt insertion hole. A collar 24 is fitted with the central bolt insertion hole.

The flange 221 of each inflator 22 is set on the rubber mounts 23 retained to the bottom plate 161, and an upper set plate 25 and a lower set plate 26 are further set on the flange 221 of each inflator 22. In this condition, the members 22, 25, and 26 are fixed to the bottom plate 161 by bolts 27 and nuts 28. The upper set plate 25 is a dishlike member having an outer circumferential portion curved to relax a sharp contact with the inner surface of the air bag 17. The lower set plate 26 is a flat member. Each of the upper and lower set plates 25 and 26 is an annular plate having a central hole to avoid interference with the corresponding inflator 22. Each bolt 27 has a head portion welded to the upper set plate 25 and projects downwardly from the upper set plate 25. The bolts 27 are inserted through holes formed through the lower set plate 26 and the flange 221 of each inflator 22, and further inserted through the collars 24 of the rubber mounts 23 so that the lower ends of the bolts 27 project from the lower surfaces of the collars 24. The nuts 28 are tightened to the lower projecting portions of the bolts 27.

Further, small bolts 29 are used to fasten the upper set plate 25 and the lower set plate 26. Each small bolt 29 has a head portion welded to the upper set plate 25 and is inserted through a hole formed through the lower set plate 26 to project downwardly therefrom. Nuts 30 are tightened to the lower projecting portions of the small bolts 29. The air bag 17 has an opening with edge portions that are sandwiched between the upper set plate 25 and the lower set plate 26, thus retaining the air bag 17 to the bottom plate 161 of the retainer box 16.

A lid 31 is mounted on an upper portion of the side plate 162 of the retainer box 16 so as to close an upper opening of the retainer box 16. The lid 31 has an edge portion 311 fitted on the outer surface of the side plate 162 and secured thereto by means of bolts and nuts 32. The edge portion 311 is formed with a horizontally projecting portion 312 for concealing a gap G between the lid 31 and the cowl 2.

The lid 31 further has a vulnerable portion 313 for allowing an easy break of the lid 31 upon inflation of the air bag 17. That is, when the air bag 17 is inflated, the vulnerable portion 313 of the lid 31 is easily broken by the inflated air bag 17, so that the air bag 17 is developed out of the retainer box 16.

As described above, each inflator 22 is mounted through the rubber mounts 23 to the retainer box 16. Accordingly, vibrations transmitted from the body frame 1 through the retainer box 16 to each inflator 22 can be reduced by the rubber mounts 23. While each inflator 22 is mounted in a floating manner such that it floats from the body frame 1 through the rubber mounts 23, the retainer box 16 is fixed directly to the body frame 1, or the upper frames 4. Accordingly, the dimensional accuracy at a fitted portion between the cowl 2 and the lid 31 can be improved, so that the gap G can be reduced to provide a good appearance.

Figure 5:
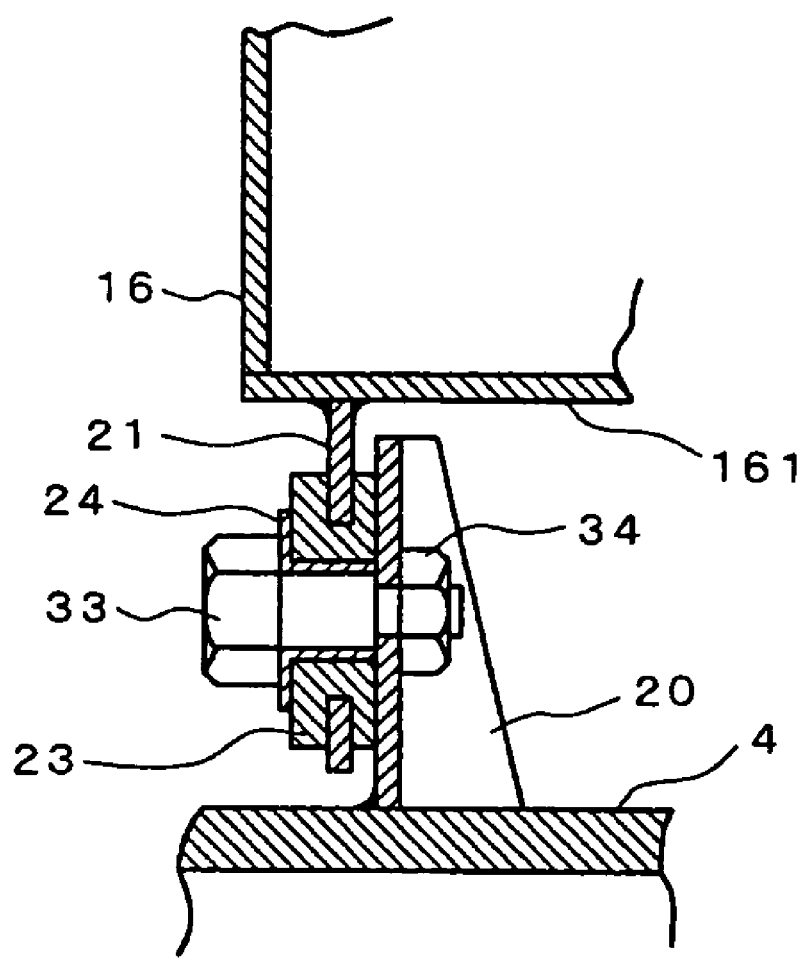
FIG. 5 is a side view showing a damping structure of a retainer box for an air bag according to a second preferred embodiment of the present invention.

FIG. 5 shows a damping structure of the retainer box 16 according to a second preferred embodiment of the present invention. In this preferred embodiment, rubber mounts 23 (one of which being shown in FIG. 5) as damping means are interposed between the retainer box 16 and the upper frames 4. More specifically, the rubber mounts 23 are mounted to the brackets 21 projecting from the bottom plate 161 of the retainer box 16, respectively. The brackets 21 are aligned to the brackets 20 projecting from the upper frames 4 with the rubber mounts 23 interposed therebetween, respectively. Each rubber mount 23 is provided with a collar 24. A bolt 33 is inserted through the collar 24 of each rubber mount 23 and through each bracket 20, and a nut 34 is tightened to each bolt 33. As a modification, the rubber mounts 23 may be mounted to the brackets 20 of the upper frames 4.

According to the present invention, vibrations transmitted to the retainer box for the air bag, e.g., vibrations transmitted from the body frame of the motorcycle to the retainer box are not directly transmitted to the inflator. Accordingly, it is not required to make the vibration resistance of the inflator itself especially larger than that of the other members. Further, unlike a mounting structure such that the whole of the retainer box is mounted through the damping elastic member to the body frame, the damping elastic member can be reduced in size. According to the present invention, the vibration resistance of the inflator can be improved by a simple configuration such that the inflator is fixed through the rubber mount to the retainer box.

According to the present invention, the retainer box is directly connected to the body frame, so that the mounting accuracy of the retainer box to the body frame can be improved. Accordingly, the gap between the retainer box and a member (e.g., cowl) of the motorcycle adjacent to the retainer box can be minimized to thereby improve the appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag system comprising:
   a retainer box;
   an inflator mounted in said retainer box; and
   an air bag mounted in said retainer box and connected to said inflator,
   said inflator being connected to said retainer box,
   said retainer box is provided with a bracket adapted to be connected to an upper body frame of a motorcycle,
   wherein the bracket of the retainer box projects orthogonally from a flat bottom plate of the retainer box, said bracket of the retainer box being connected to a corresponding bracket projecting orthogonally from the upper body frame of the motorcycle,
   wherein the damping elastic member is interposed between the brackets such that a bolt passes through the bracket of the upper body frame, the damping elastic member and the bracket of the retainer box to secure the retainer box to the upper body frame of the motorcycle, and suppresses vibration from the upper body frame to the inflator.

2. The air bag system according to claim 1, further comprising a rubber mount inserted through the bottom plate of said retainer box and retained thereto;
   said inflator being connected to said retainer box another bolt inserted through said rubber mount and a nut tightened to said another bolt.

3. The air bag system according to claim 2, and further comprising a set plate for connecting an opening portion of said air bag to said inflator;
   said set plate and said inflator being secured to said retainer box by said another bolt inserted through said set plate, a flange formed on said inflator and said rubber mount.

4. The air bag system according to claim 2, wherein the rubber mount includes a plurality of rubber mounts provided for mounting said inflator to said retainer box.

5. The air bag system according to claim 4, wherein each rubber mount includes a body portion with a groove disposed thereon for engaging with a corresponding portion of the retainer box and an upper portion for mounting a flange connected to said inflator for suppressing vibrations from a body frame.

6. The air bag system according to claim 5, wherein said groove is disposed substantially parallel to the bottom plate of the retainer box for aligning with said bottom plate of said retainer box and said flange of said inflator.

7. The air bag system according to claim 1, wherein said damping elastic member includes a body portion with a groove disposed thereon for engaging with a corresponding portion of retainer box, said damping elastic member being secured to the upper body frame for suppressing vibrations from the upper body frame.

8. The air bag system according to claim 1, further comprising:
   air bag anchoring mechanisms connected to a main body frame of the motorcycle and to the air bag, said air bag anchoring mechanisms extending from a neutral position at which the air bag is contained within the retainer box to an extended position in front of the driver of the motorcycle when the air bag is inflated by the inflator.

9. An air bag system comprising:
   a retainer housing;
   an inflator mounted within said retainer housing; and
   an air bag mounted within said retainer box and operatively connected to said inflator;
   said inflator being connected to said retainer housing,
   wherein said bottom portion of said retainer housing is provided with a bracket adapted to be connected to an upper body frame of a motorcycle,
   wherein the bracket of the retainer housing projects orthogonally from a flat bottom plate of the retainer housing, said bracket of the retainer housing being connected to a corresponding bracket projecting orthogonally from the upper body frame of the motorcycle, wherein the damping elastic member is interposed between the brackets such that a bolt passes through the bracket of the upper body frame, the damping elastic member and the bracket of the retainer housing to secure the retainer housing to the upper body frame of the motorcycle, and suppresses vibration from the upper body frame to the inflator.

10. The air bag system according to claim 9, further comprising a rubber mount inserted through a bottom portion of said retainer housing and being retained relative thereto;

said inflator being connected to said retainer housing bolt inserted through said rubber mount and a nut tightened to said another bolt.

11. The air bag system according to claim 10, and further comprising a set plate for connecting an opening portion of said air bag to said inflator;

said set plate and said inflator being secured to said retainer housing by said another bolt inserted through said set plate, a flange formed on said inflator and said rubber mount.

12. The air bag system according to claim 10, wherein the rubber mount includes a plurality of rubber mounts provided for mounting said inflator to said retainer housing.

13. The air bag system according to claim 12, wherein each rubber mount includes a body portion with a groove disposed thereon for engaging with a corresponding portion of the retainer housing and an upper portion for mounting a flange connected to said inflator for suppressing vibrations from a body frame.

14. The air bag system according to claim 13, wherein said groove is disposed substantially parallel to the bottom plate of the retainer housing for aligning with said said bottom plate of said retainer housing and said flange of said inflator.

15. The air bag system according to claim 9, wherein said damping elastic member includes a body portion with a groove disposed thereon for engaging with a corresponding portion of retainer housing, said damping elastic member being secured to the upper body frame for suppressing vibrations from the upper body frame.

16. The air bag system according to claim 9, further comprising:

air bag anchoring mechanisms connected to a main body frame of the motorcycle and to the air bag, said air bag anchoring mechanisms extending from a neutral position at which the air bag is contained within the retainer housing to an extended position in front of the driver of the motorcycle when the air bag is inflated by the inflator.

* * * * *